UNITED STATES PATENT OFFICE.

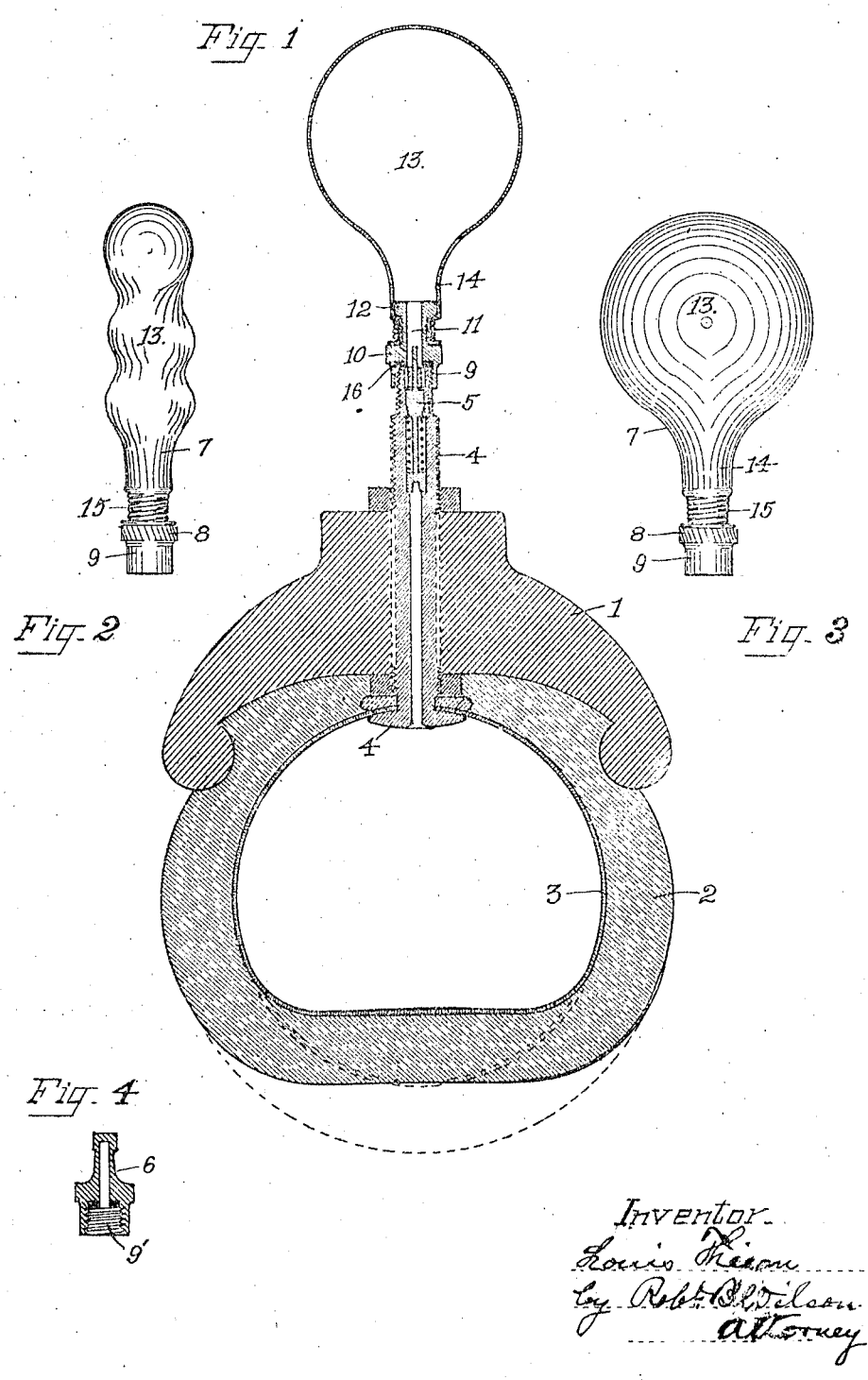

LOUIS THIEM, OF TOLEDO, OHIO.

LEAK-LOCATING DETECTOR FOR PNEUMATIC TIRES.

1,270,073. Specification of Letters Patent. Patented June 18, 1918.

Application filed January 2, 1918. Serial No. 210,053.

*To all whom it may concern:*

Be it known that I, LOUIS THIEM, a citizen of the United States, residing at Toledo, in the county of Lucas and State of Ohio, have invented new and useful Improvements in Leak-Locating Detectors for Pneumatic Tires, of which the following is a specification.

My invention relates to a leak locating detector for pneumatic tires, and has for its object to provide a device of the kind that is adapted to be readily attached to the valve stem of the inner tube of a pneumatic tire, showing loss of air pressure, and when so attached to indicate whether the loss of air is due to a leak in the valve of the inner tube, or to a puncture of the inner tube, whereby, if shown to be in the valve, unnecessary removal of the tire casing from the rim is avoided.

I accomplish these objects by the construction and combination of parts, as hereinafter described and illustrated in the drawings, in which—

Figure 1 is a diametric section of a leak detector constructed in accordance with my invention in position attached to the valve stem of the inner tube, and longitudinally of the stem, and showing a cross section of the rim and partly collapsed tire of an auto wheel.

Fig. 2 is a side view of the indicating device when detached, or when attached and indicating that the leak is in the inner tube.

Fig. 3 is a similar view of the device attached, and indicating a leak in the valve; and Fig. 4 is a longitudinal, diametric section of the cap of the valve stem detached.

In the drawings 1 designates the rim of the outer casing, 2 the outer casing, 3 the inner tube, and 4 the valve stem of the inner tube of a pneumatic tire of an auto wheel.

The valve stem 4 is of the standard form and construction used with the inner tubes of pneumatic tires, and is provided with the standard flexible pressure testing valve 5, inserted and detachably and internally threaded into the top end of the stem 4, said stem having a cap 6 adapted to be run on an externally threaded top end portion of the stem.

The detector device 7 comprises a nozzle 8 having an internally threaded nipple 9, projecting from the knurled head portion 10, and the hollow stem portion 11, having the enlarged and rounded hollow end portion 12, and the (preferably elastic) collapsible and inflatable sack 13 having a neck portion 14 drawn over the head end 12 and secured to the stem portion 11 of the nozzle 8, by any suitable means, preferably by a winding 15.

The nipple 9 is a duplicate of the nipple 9' of the closure cap 6 of the valve stem 4, and is provided with a packing 16, whereby when the cap 6 is removed from the stem 4 the detector device 7 may be attached thereto by running the nipple 9 onto the outwardly threaded end portion of the stem with the end of the stem compressing the packing 16.

When so attached, if there is a leak in the valve of the stem, the sack 13 will at once begin to show an expansion, and thereby indicate that there is a leak in the valve of the stem, which being corrected by removing the valve 5 and substituting a new one, the pump is applied to the stem, and the tire is reinflated and the indicator being again attached, if there is no inflation of the sack 13 it indicates there is no longer any leak in the valve.

If, however, there is still a loss of pressure in the tire, it is definitely indicated that there was also a leak in the inner tube, which requires that the casing and the inner tube be removed from the rim to stop.

By the use of my detector, when the tire shows leakage, the location of the leak, whether in the valve or a puncture of the inner tube can be definitely known, as hereinbefore described, before removal of the tire, whereby loss of time and labor in useless removal of the tire when the leak is in the valve alone is wholly avoided.

What I claim to be new is—

A device of the kind and for the purpose described, comprising a collapsible and inflatable sack having a reduced neck portion and a nozzle having a hollow stem portion inserted into and non-leakably secured to the neck portion of the sack and a coupling nipple portion, adapting the nozzle to be secured to the free end portion of the valve stem of an inner tube of an auto tire, interchangeably with the cap of the stem.

In testimony whereof I have hereunto set my hand at Toledo, Ohio, this 22nd day of December, 1917.

LOUIS THIEM.